United States Patent [19]

Wiegand et al.

[11] 4,393,719
[45] Jul. 19, 1983

[54] IONIZATION FLOWMETER

[75] Inventors: Walter J. Wiegand, Glastonbury; Robert H. Bullis, Avon, both of Conn.

[73] Assignee: United Technologies Corporation, Hartford, Conn.

[21] Appl. No.: 284,837

[22] Filed: Jul. 20, 1981

[51] Int. Cl.³ .............................................. G01F 1/70
[52] U.S. Cl. .............................. 73/861.05; 73/861.09
[58] Field of Search ....................... 73/861.05, 861.09; 324/453, 455

[56] References Cited

U.S. PATENT DOCUMENTS

| 2,827,786 | 3/1958 | Boyd et al. | 73/861.05 |
| 4,056,003 | 11/1977 | Zizine | 73/861.09 |
| 4,074,572 | 2/1978 | Bullis et al. | 73/861.09 |
| 4,186,601 | 2/1980 | Maruoka | 73/861.05 |

Primary Examiner—Charles A. Ruehl
Attorney, Agent, or Firm—Eric W. Petraske

[57] ABSTRACT

A flowmeter for the measurement of fluid flow employs a combination of two transit times for the passage of charged particles through a known distance under different conditions. Applications include the measurement of the air-fuel mixture in automobile engines.

25 Claims, 10 Drawing Figures

IONIZATION FLOWMETER

DESCRIPTION

TECHNICAL FIELD

The invention relates to a method and apparatus for the determination of fluid flux and/or fluid mass flow by measurement of the transit times of pulses of charged particles and by measurement of differential current flow.

BACKGROUND ART

The art of measuring the flux of a fluid by an analog method is summarized in U.S. Pat. No. 4,074,572 by Bullis et al, assigned to the assignee of this application, in which a current-measuring technique produces a continuous measurement of fluid flow. Although that method works very well, it is susceptible to DC amplifier drift and calibration problems that inherently affect analog devices. The use of pulsed devices to measure fluid velocity, as opposed to flux, has involved the injection of a pulse of ions that flow along with the fluid, so that the measured transit time is directly related to the fluid velocity. For example, U.S. Pat. No. 2,827,786 and No. 2,637,208 both disclose devices for measurement of the velocity of a gas based upon this principle. If a measurement of the mass flow were desired, using such equipment, it would be necessary to additionally measure the temperature and pressure of the flowing gas.

In the prior art pulsed ion flowmeters, an ion pulse drifted with the gas flow, without the use of an applied drift field. In these prior art pulsed ion devices fluid flow velocity was measured, not fluid flux, which is directly related to fluid mass flow. Further, in prior art radial type ionization flowmeters in which fluid flux is measured, account has not been taken of the impact real world environmental factors have on meter performance; mainly measurement accuracy. The key factor impacting measurement accuracy in ion drift type flowmeters is the question of the identity of the ions that are formed, the mobility of these ions, the stability of the ions and the danger of contaminants giving rise to false readings. These significant problems have been addressed and solved by the invention disclosed herein.

DISCLOSURE OF INVENTION

The invention relates to the measurement of fluid flux and/or mass flow, by means of a pulsed ionization system, in which measurement of the transit times of two ion pulses traversing fixed lengths under the influence of the fluid flow and of electric fields applied parallel to the flow are combined with other parameters of the apparatus to provide a measurement of the fluid flux and also by means of an analog ionization system, in which the measurement of the change in ion current produced by a change in applied electric field over a known flow field distance is combined with other parameters of the apparatus to provide a measurement of fluid flux.

BEST MODE FOR CARRYING OUT THE INVENTION

Figure 1:
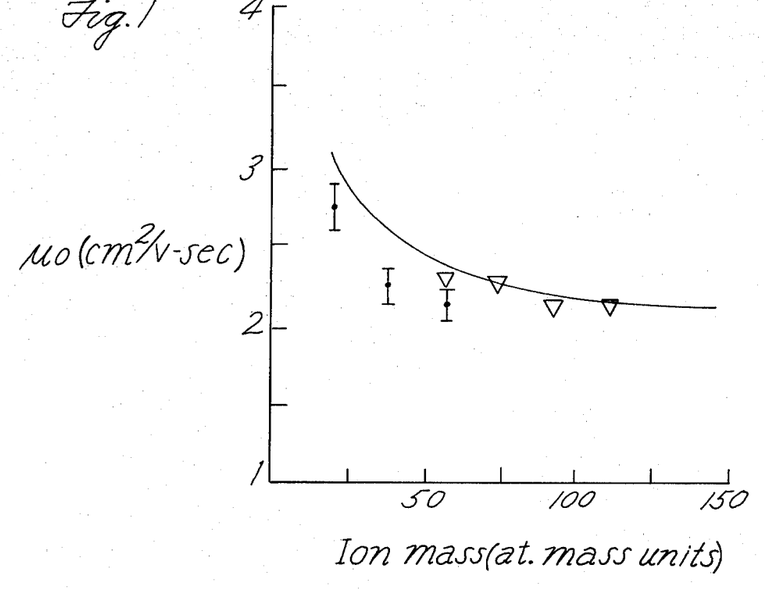
FIG. 1 shows the relation between ion mobility and ion mass for hydrated protons in atmospheric air.

In the case of a flowmeter measuring the flux of air taken from different environments, it has been determined experimentally that, when ions are produced in moist air by a positive corona discharge, nitrogen and oxygen ions are initially formed. Subsequent charge exchange reactions with water molecules on a time scale of less than a microsecond result in the production of hydrated protons of the form $H^+\cdot(H_2O)_n$, where n varies from one to 8. The mobility of the larger hydrated proton cluster ions changes very little for values of n within the range of 4 to 8 as can be seen from the ion mobility data of FIG. 1. Presented in FIG. 1 are experimental mobility values for $H^+\cdot(H_2O)_n$ cluster ions in air for various values of n, together with theoretically predicted mobilities determined from the Langevin equation. The triangle data points were measured at United Technologies Research Center and the other points were measured in nitrogen by Dotan et al (J. Chem. Phys. 65, 5028 (1976). The Langevin equation is derived in Chapter 9 of Collision Phenomena In Ionized Cases, by E. W. McDaniel (John Wiley, 1964).

From this ion mobility data it is clear that the size of the hydrated proton ion cluster influences ion mobility. Only when the hydrated proton ion cluster reaches cluster sizes having four or more water molecules does the ion mobility become substantially constant as is required for accurate flowmeter operation. Accordingly, in the operation of an ion drift flowmeter, drift field conditions must be maintained in a manner which ensures that cluster ion dissociation does not occur in the drift region. To prevent the destruction of ion clusters, the applied electric field in the drift region must be maintained at a sufficiently low level to prevent the ions from gaining significant energy from the field between collisions with neutral gas molecules. If not controlled, the energy gain between collisions, or ion heating phenomena, will lead to cluster ion collisional interactions in which sufficient energy is available to break the low energy bonds associated with the formation of the cluster. The preferred electric field for ambient air conditions is less than 7600 V/cm. This corresponds to an electric field to neutral gas pressure ratio (E/P) of 10 V/cm Torr. For gases other than air the limiting E/P ratio to prevent significant ion heating is different from that for air and is dependent on the specific details of the particular ion collisional processes involved.

A second factor which can introduce errors in the flowmeter measurement accuracy arises from the presence of other chemical species which can produce ions having mobilities different from the $H^+ \cdot (H_2O)_n$ cluster ions. These other chemical species may be contaminants, not ordinarily present in the fluid being measured; or they may be a component of the fluid mixture present in varying amounts that sometimes exceeds a threshold concentration relative to the other naturally occurring species.

Figure 2A:
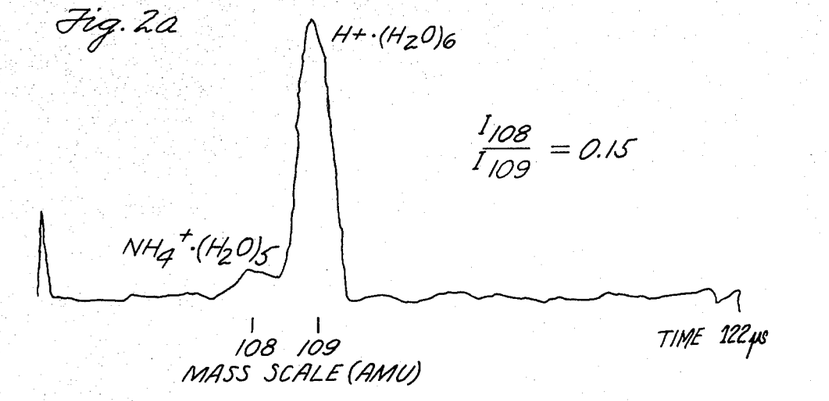
FIGS. 2a-2c show the conversion with time of hydrated protons to hydrated ammonium ions.
Figure 2B:
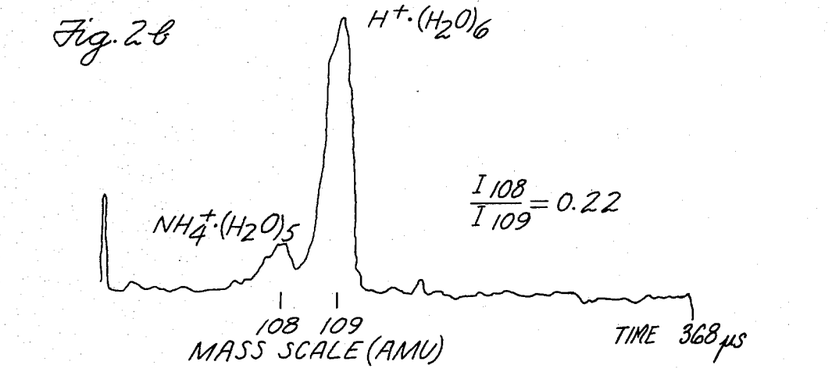
Figure 2C:
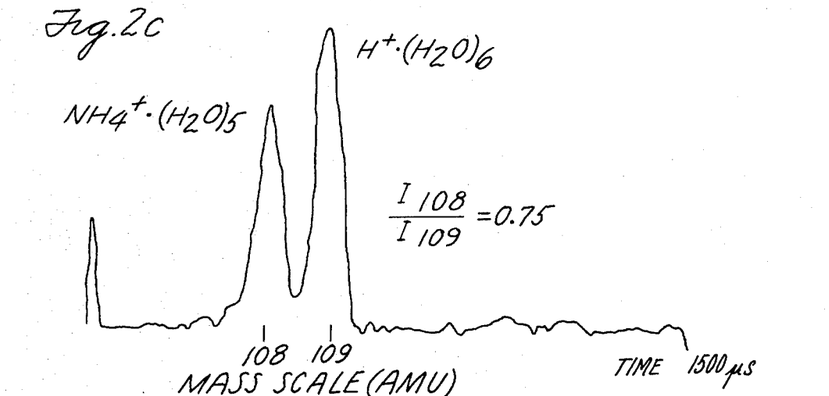

In the particular case of an ion drift flowmeter that measures the air component of the air-fuel mixture entering an automobile engine, it has been found that an important source of contamination is naturally occurring ammonia, which leads to the formation of ammonium ions, $NH_4^+ \cdot (H_2O)_{n-1}$. These ions are approximately 18 percent more mobile than corresponding $H^+ \cdot (H_2O)_n$ ions and thus will arrive at a detector sooner, giving rise to a measurement which can be in error by as much as this factor of 18 percent. The time development of ammonium ion contamination by formation from $H^+ \cdot (H_2O)_n$ is shown in FIG. 2, in which the relative numbers of ammonium and hydrated proton ions are shown at times of (a) 122 microseconds, (b) 368 microseconds and (c) 1,500 microseconds for typical flowmeter conditions. The data shown in FIGS. 2a–2c was obtained for a naturally occurring ambient ammonia concentration of ten parts per billion and indicates that the characteristic time in which the ammonium ion concentration becomes comparable to the hydrated proton concentration is approximately 1 millisecond. Obviously, for higher ammonia concentrations this time scale will be decreased. Because the conversion to ammonium ions under typical automotive operating conditions is generally much slower than the development of large hydrated proton ion clusters, it is possible to design an ion drift flowmeter in which the maximum time for hydrated proton passage through the flowmeter will be considerably less than the time required for the ammonium ion concentration to become significant. For specific gas pressure and temperature conditions, the ion transit time will depend on the electrode spacing, the applied electric field and the range of fluid speeds that are to be measured. Accordingly, ion identity can be controlled by the appropriate choice of device parameters.

The effect of breakup of the hydrated proton ion clusters and of the conversion of hydrated protons to other ion species can result in significant changes in ion mobilities, and therefore, in ion transit times across the flowmeter. The adjustment of the operating parameters of the meter to prevent ion cluster breakup and change in ion identity in order to maintain constant ion mobility conditions will be referred to as ion identity control. If the fraction of ions that are hydrated protons remains substantially the same during the transit through the meter, we say that ion identity has been preserved.

A further complicating factor in the operation of ion drift flowmeters under real world environmental conditions is that devices employing corona discharge ion sources are subject to ion source surface contamination. This results in changing ion emission levels from the upstream and downstream portions of the corona source. In simplified analog meter designs this produces highly undesirable time varying changes in meter calibration. By measuring the transit time of a sharply defined pulse of electrical charges or a step function change in current flow, as opposed to steady state DC current levels, the influence of corona source emission characteristic on meter calibration can be completely eliminated.

Figure 3:
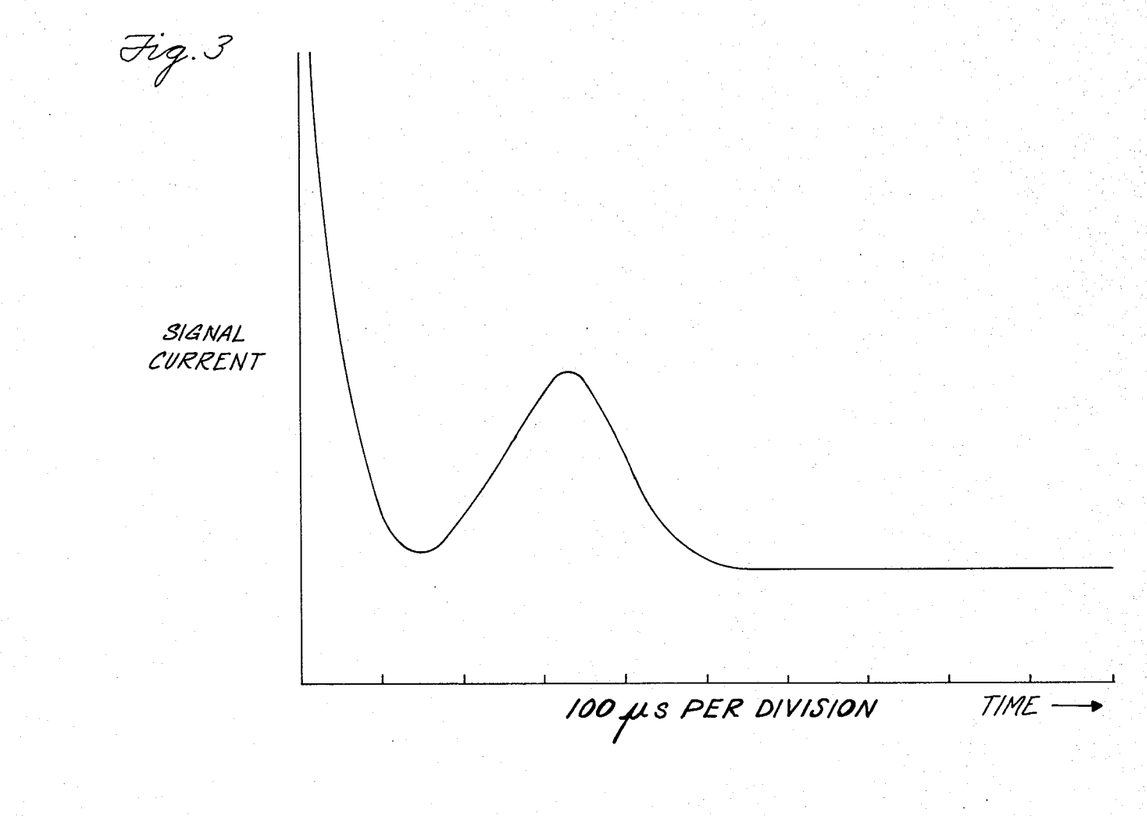
FIG. 3 shows a typical pulsed ion current signal.

In the simplest embodiment of the transit time or pulsed measurement approach a step function change, i.e. a sharp change, either increasing or decreasing in the current flow from the ion source, is employed in the measurement. The resulting current detected at the meter collector, a typical example of which is shown in FIG. 3, is comprised of two components. The intial current peak is caused by capacitive effects within the flowmeter structure, followed by a second current peak caused by the motion of ions toward and away from a detector grid. The maximum in the second peak occurs at the time the leading edge of an ion current pulse passes through the detector grid. Determination of the ion transit time through the meter is then accomplished by measurement of the time from initiation of the step function current change at the corona source to the time of arrival of the second current peak at the ion collector. Discrimination between the actual current arrival at the collector grid and the initial capacitively coupled current signal is simply accomplished with conventional time delay blanking circuitry which prevents measurement of current signals at the detector for a period of time immediately after a voltage change is applied to the corona grid. The duration of this blanking period, however, is purposely maintained short in comparison to ion transit times from the corona source to the detector grid to ensure that the arrival of the leading edge of the ion current pulse is detected.

Figure 4:
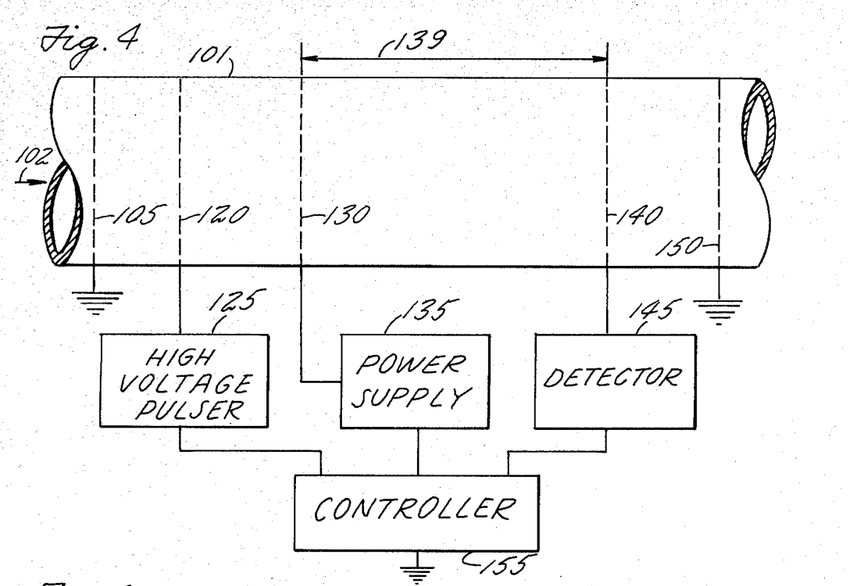
FIG. 4 shows, in partially pictorial, partially schematic form, a pulsed embodiment of the invention in which ion flow in one direction is employed.

An illustrative embodiment of the pulsed ion current flowmeter invention is shown in FIG. 4, in which cylinder 101 forms a channel through which fluid 102 flows. Cylinder 101 may be a pipe carrying all the fluid of interest or it may be a cylindrical housing in a larger pipe. It is not essential for the practice of the invention in its broadest scope for the fluid to be confined entirely within the meter outer housing, although measurement accuracy can suffer in certain flow field situations with meter configurations not employing outer housings to define the flow profile. Fluid 102 first flows through screen 105, which is electrically grounded for safety considerations. Screen 105, like all the non-emitting electrodes in this embodiment, is a perforated sheet of conducting corrosion-resistant material that extends substantially across cylinder 101 perpendicular to the axis but presents minimal flow blockage and perturbation to the fluid 102. The open area of this grid structure is typically 72 percent of the total. Further, it has been found possible through the use of hexagonal perforations in the grid structure to achieve highly uniform flow conditions.

Ion source grid 120, illustratively an array of 0.005 inch diameter wires, is maintained at a voltage of approximately five to ten kilovolts with respect to ground potential by high voltage pulsed power supply 125, so that ions are produced across the face of grid 120 by corona discharge processes. At a predetermined time, the voltage on grid 120 is varied in a step function manner up or down by a few hundred volts in response to a signal from controller 155. Controller 155 also starts a clock at the same instant in time as the step function voltage pulse is applied to corona grid 120. In response to the step function change in voltage applied to corona grid 120, a corresponding step function increase or decrease in ion emission from the grid results. Measurement of the time required for this change in current to propagate from the corona source to the current detector provides information on the fluid flux passing through pipe 101 in the manner described below.

The duration in time of the ion current pulse may range from extremely short in comparison to fluid flow times, i.e. a delta function, to a time long compared with the transit time to be measured, i.e. a step function, since this flowmeter embodiment is designed to respond to changes in the ion current flow. For a step function change in ion current flow, the leading edge of the ion current pulse, which is characterized by a sharp change in the local ion concentration, passes through grid 130, maintained at a predetermined positive voltage, illustratively half the steady-state voltage of corona grid 120, by power supply 135. Grid 130 acting cooperatively with grid 140 which is spaced at a known downstream distance 139 of L, and operated at a voltage near ground potential serves to define a uniform electric field drift region 139. The edge of the ion current pulse travels, under the influence of the gas flow and the applied electric field, through a predetermined length of the electric field drift region 139 to detector grid 140, connected to a voltage biased low impedance detector circuit 145. The passage of the step function change in ion current flow through grid 140 which also serves as a detector electrode will produce in detector circuit 145 a signal similar to that shown in FIG. 3.

Detector circuit 145 will not initially respond to the edge of the current flow change until it emerges from grid 130, because the electrical shielding grid 130 provides for detector grid 140. However, once the leading edge of the current flow change enters the uniform electric drift field region 139 an image charge directly proportional to the changing amount of charge entering drift field region 139 will be induced on detector grid 140. This induced charge on detector grid 140 produces the current rise leading to the second current peak shown in FIG. 3. As the leading edge of the current change propagates across drift region 139, the current induced in detector grid 140 will continue to increase in response to the increasing amount of charge flowing into drift region 139. For a uniform step function current change, detector grid current will continue to increase until the instant in time the leading edge of the current flow change passes through detector grid 140. At this point in time, the charge density in drift region 139 is uniform and remains constant with time. Further passage of the leading edge of the current flow change into the downstream region defined by detector grid 140 and grid 150 which is operated in a fashion similar to grid 105 at ground potential for safety reasons, results in a gradual decrease in the current induced in detector grid 140 as the leading edge of the current flow change recedes from detector grid 140. Additionally, as the current arrives at grid 150 and is either collected or passes through grid 150 the image charge corresponding to this current is no longer induced in detector grid 140. This produces the declining current characteristic shown in the current wave shape of FIG. 3. The current peak induced in the detector grid circuit is measured by conventional circuitry, such as a differentiator followed by a comparator referenced to zero voltage, the detected peak is used by controller 155 to stop the above-mentioned timing clock, giving a transit time that is stored for later use. It will be easily recognized by those skilled in the art that alternate geometries and spacings between the grids in the above-described flowmeter configuration can be employed effectively to provide with nonelectrical means shaping of the detector current pulse signal. The biasing and control of the potential applied to the grids can be simply accomplished through the use of batteries. Alternately, a more cost effective and simpler approach for the grids located close to the corona source is to use the steady corona current in conjunction with a fixed resistor of suitable size to provide both the grid bias and corona grid operating current level. For the data of FIG. 3, the meter geometry had typically a pipe diameter of 15.4 cm with a drift field length of 1 cm and the spacing between the corona grid 120 and adjacent drift field grid 130 of approximately 4 mm. With this geometrical approach a highly uniform infinite plane parallel electric field geometry was achieved. For this geometrical configuration and the above-mentioned operating voltages, ambient air flows ranging between mass flows of 0.45 kg/min and 23 kg/min could be directly measured under all environmental conditions with a meter calibration linearity of 1 part in $10^4$ and a measurement accuracy of ±2 percent.

It should be noted a major advantage of the above described ion drift flowmeter geometry which is coaxial with the flow is that a uniform electric field drift region is achieved. In this manner, careful control of the ion lifetime and the operating E/P ratio in the meter can be achieved to control ion identity and prevent ion cluster breakup due to ion heating effects. In contrast, radial meter geometries cannot easily achieve uniform electric field conditions. Therefore, control cannot be fully exercised over ion lifetime and ion heating effects, leading to a strong sensitivity of the meter calibration to environmental factors such as the changing content of naturally occurring water vapor in the air, i.e. atmospheric humidity changes. A second advantage of the pulsed ion drift flowmeters described herein is that meter operation and calibration is insensitive to changes in the magnitude of the corona source current level. This further reduces any environmental sensitivity such as is frequently encountered with analog devices.

In operation of the ion drift meter with above-described geometry (FIG. 4), two measurements of the ion transit time at different drift field levels are required for the direct determination of fluid mass flow. First the ion transit time is determined for a given voltage of V applied to grid 130. Then the measurement is repeated with a different value of voltage, illustratively V/2, on grid 130. Controller 155 contains circuits for triggering high voltage pulser 125 at the correct time, switching power supply 135 from one voltage to the other, storing the ion transit times derived from signals of detector 145 and performing the computation described below.

The first measured transit time is, $T_1 = L/(v_1 + V_g)$, where L is the length of the uniform electric drift field region 139, $v_1$ is the first drift velocity and $v_g$ is the gas velocity. Further, $v_1 = \mu E = \mu_o N_o V/NL$ where $\mu_o$ is the ion mobility at standard conditions of temperature and pressure (zero degrees C and 1 atmosphere); $N_o$ is the particle density of the fluid at standard conditions of temperature and pressure and N is the particle density of the fluid being measured at a specific temperature and pressure. The error introduced in $T_1$ by starting the timing clock when the ion current change is produced at corona grid 120, rather than when the leading edge passes grid 130, is minimized by spacing grids 120 and 130 in close proximity and by maintaining a large potential difference between them in comparison to the electric fields existing in the drift field region. Similarly, the second measured ion transit time is given by $T_2 = L/(v_2 + V_g)$ and $v_2 = \mu_o N_o (V/K)/NL$, where K is the ratio of first and second voltages. Combining the transit time expressions to determine the fluid flux yields:

$$\text{flux} = Nv_g A = \left(\frac{\mu_o N_o V A}{KL}\right)\left[\frac{KT_1 - T_2}{T_1 - T_2}\right] \quad (1)$$

where A is the cross sectional area of cylinder 101. The mass flow may be obtained from this fluid flux expression simply by multiplying the flux term ($Nv_g A$) by the average mass per particle of the fluid.

The computations in equation 1 may be performed by either analog or digital circuits, in a manner well known to those skilled in the art. The most advantageous approach would be to have a special-purpose chip made to perform the functions of controller 155 and thus reduce the cost and increase the reliability of the electronics package. The device illustrated in FIG. 4 would be electrically shielded by simply providing a grounded electrical coating on the outside of pipe 101 to eliminate interference from external noise sources, such as spark plugs, and interference to other devices, such as automobile radios.

The corona source in the above described embodiment is a wire array maintained at a voltage sufficiently high to generate ions by means of a corona discharge in fluid 102. Many other methods of generating ion currents and changes in ion current are also possible. For example, the steady state operating condition may be no ion current generation, with grid 120 being pulsed by kilovolt pulses to generate ions; and the duration of the pulse may be varied from a few microseconds in duration to a step function. Generation of an extremely short duration ion current pulse gives rise to greater capacitive effects relative to the step function. However, with care in the suppression of the capacitively coupled current, successful device operation has been demonstrated. Also, a continuous ion source, such as a radioactive source, may be used in connection with grids that act as shutters, in which case, the time of entry of the ion current change into the drift field region may be sensed directly, rather than using the time of application of a voltage change to grid 120, as was discussed above or with respect to the FIG. 4 meter configuration.

The foregoing embodiment employed the leading edge of a step function change in ion current, for the determination of ion transit times. Other embodiments will be readily apparent to those skilled in the art that use the trailing edge or a short time duration ion current pulse.

Figure 8:
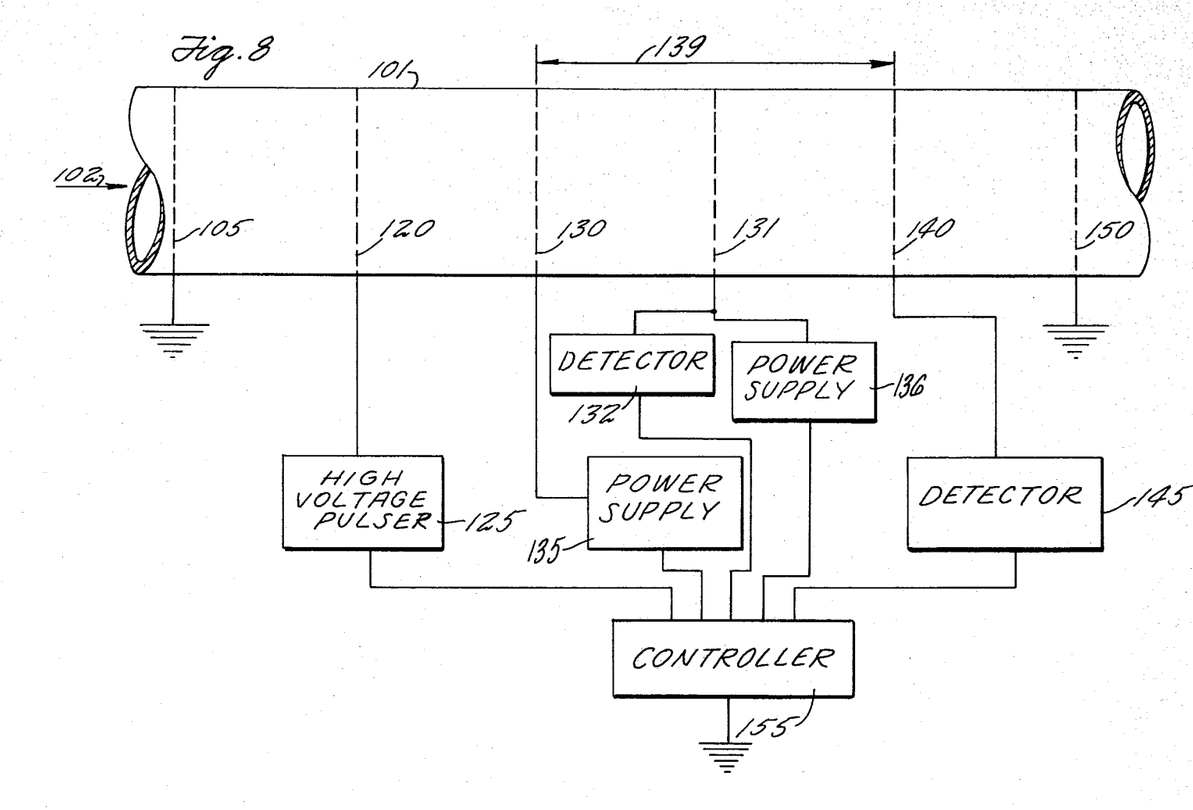
FIG. 8 shows, in partially pictorial, partially schematic form, an alternative embodiment of that of FIG. 4.

An alternate embodiment of this invention is illustrated in FIG. 8 in which the apparatus of FIG. 4 is modified by the inclusion of additional grid 131 between grids 130 and 140, which grid 131 is maintained at a second potential V' by power supply 136 and is coupled to a detector 132 similar to detector 145. Thus, two constant drift fields would be maintained and two transit times between grids 120 and 131 and grids 120 and 140 would be measured in order to give the two measurements having different relations between drift velocity and fluid velocity that are required in order to measure fluid flux or mass flow. In this configuration, corona grid 120 is located in close proximity to grid 130. Compared with the embodiment of FIG. 4, this alternative has an additional electrode and high voltage power supply but operates at constant applied voltages.

Let the distance between grids 130 and 131 be $L_1$, the corresponding voltage $V_1$, field $E_1$ and transit time $T_1$. For grids 131-140, the corresponding quantities are $L_2$, $V_2$, $E_2$ and $T_2$.

$$\text{Then flux} = (\mu_o N_o A\, E_2)\left(\frac{fL_2 T_1 - L_1 T_2}{L_1 T_2 - L_2 T_1}\right) \quad (2)$$

where $f = E_1/E_2$ and f must not be equal to 1.

Figure 5:
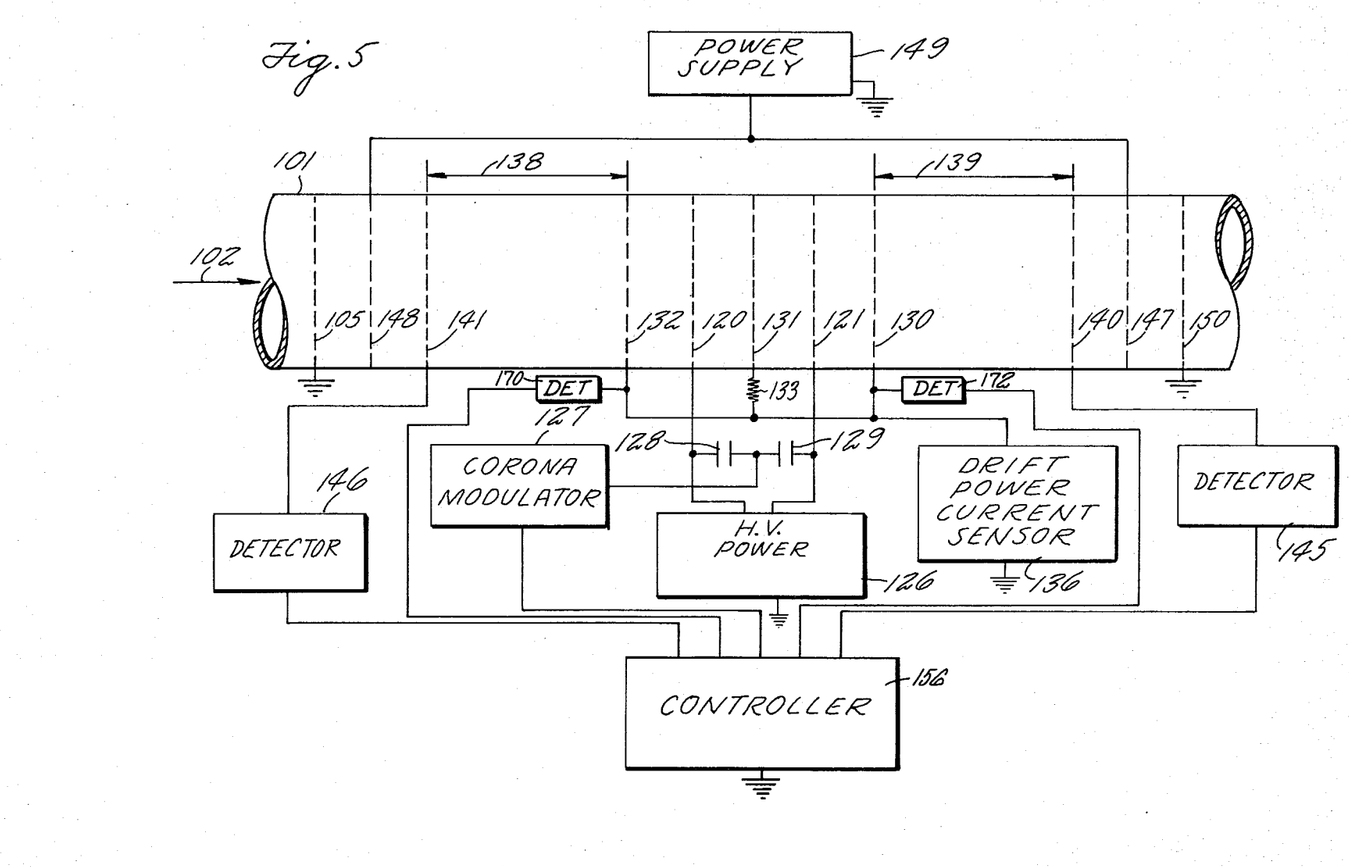
FIG. 5 shows, in partially pictorial, partially schematic form, a pulsed embodiment of the invention in which both upstream and downstream ion flow is employed.

A preferred embodiment of this invention that provides for highly accurate long term meter performance at the cost of greater complexity is shown in FIG. 5, in which corona grids 120 and 121 produce ions independently in fluid 102. The separate grids are provided in order to compensate for possible severe corona grid contamination problems. Contaminants have been found to deposit preferentially on the upstream side of the grids resulting in a change in the ion emission in that direction over time. A pulsed ion drift flowmeter will be more resistant to such changes in current level than will an analog flowmeter, but over a long period of time or in operation in an extremely dirty environment a substantial decrease in upstream corona ion emission may develop, thereby making ion transit time measurement more difficult. If separate corona grids are provided, compensation for corona contamination can be made and the ion current emission levels in the upstream and downstream directions may be maintained equal by electronic means. Step function changes in ion current flow then pass in the downstream and upstream directions through grids 130 and 132, respectively, which are set at the same voltage V by power supply 136. Grid 131 is biased relative to grids 130 and 132 by resistor 133 and is used to isolate the two corona grids from one another, causing the ion emission of each grid to flow principally into its corresponding drift region. The modulating voltage is coupled by capacitors 128 and 129 to grids 120 and 121 from corona pulse modulator 127 which also triggers a clock in controller 156 to start pulse timing circuits. Alternatively, the time of passage through grids 130 and 132 could be detected by detectors 170 and 172 and used to start clock circuits. The leading edge of the two ion current pulses passes through constant electric field drift regions 138 and 139 under the influence of the constant drift field conditions and the gas flow field. An additional condition that must be maintained in this embodiment is that the ion drift velocity must be sufficiently greater than the largest anticipated gas velocity so that the upstream moving ions will reach the detector before conversion to other ion species becomes significant. The downstream and upstream changes in ion current flow pass through grids 140 and 141, respectively, producing signals in the outputs of detector circuits 145 and 146, which stop clocks that measure the downstream and upstream transit times. Grids 147 and 148, maintained at a potential $V_2$ slightly negative with respect to ground by power supply 149 serves to provide electrical shielding that improves the shape of the signal pulse from detectors 145 and 146. Grounded collector grids 150 and 105 serve the same functions as provided in earlier described embodiments.

Controller 156 receives a start pulse from modulator 127 that starts clocks for measuring the upstream and downstream transit times and stop pulses at different times from detectors 145 and 146. In order to calculate the flux from the upstream and downstream transit times, let $T_1 = L/(v_D - v_g)$ be the upstream transit time and $T_2 = L/(v_D + v_g)$ be the downstream transit time, where $v_D = \mu_o N_o V/NL$ is the ion drift velocity which is the same for both upstream and downstream sections of the apparatus. The other symbols are as defined above. Combining the equations for transit time and solving for flux as before:

$$\text{flux} = NV_g A = \left(\frac{\mu_o N_o V A}{L}\right) \cdot \left(\frac{T_1 - T_2}{T_1 + T_2}\right) \quad (3)$$

This computation is performed in controller 156.

Figure 6:
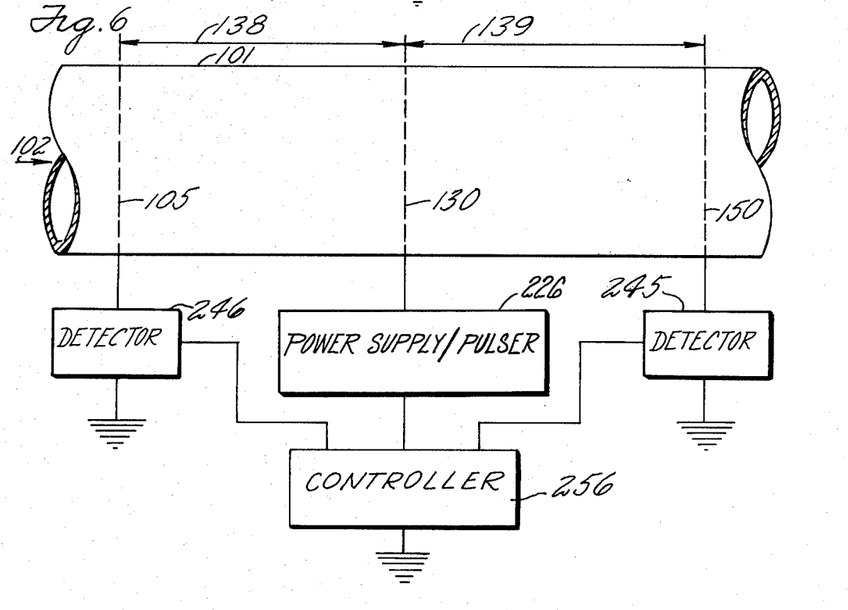
FIG. 6 shows, in partially pictorial, partially schematic form, a simplified pulsed embodiment of the invention.

A fourth, much simpler embodiment of the invention is shown in FIG. 6, in which fluid 102 flows through cylinder 101 past collector grid 105, corona grid 130 and collector grid 150. Power supply 226 maintains corona grid 130 at a constant voltage level V. Also power supply 226 applies a high voltage extremely short duration (approximately one microsecond) pulse to corona grid 130 to promote ion emission by a corona discharge. Grid 130 thus performs the functions of both the ion generation source from the corona grid and one element of the grid structure which acting cooperatively with downstream detector grid 150 and upstream detector grid 105 operating at near ground potential produce uniform downstream and upstream drift field regions respectively. Two narrow ion groups produced by the high voltage short duration pulse applied to the corona grid 130 traverse under the influence of the applied downstream and upstream drift fields and the fluid flow field, drift field regions 138 and 139. Timing signals are generated by power supply 226 and by detectors 245 and 246 to start and stop timing clocks, as previously described. Controller 256 measures the elapsed time and performs the computations in a fashion similar to the dual drift field configuration of FIG. 5.

Figure 7:
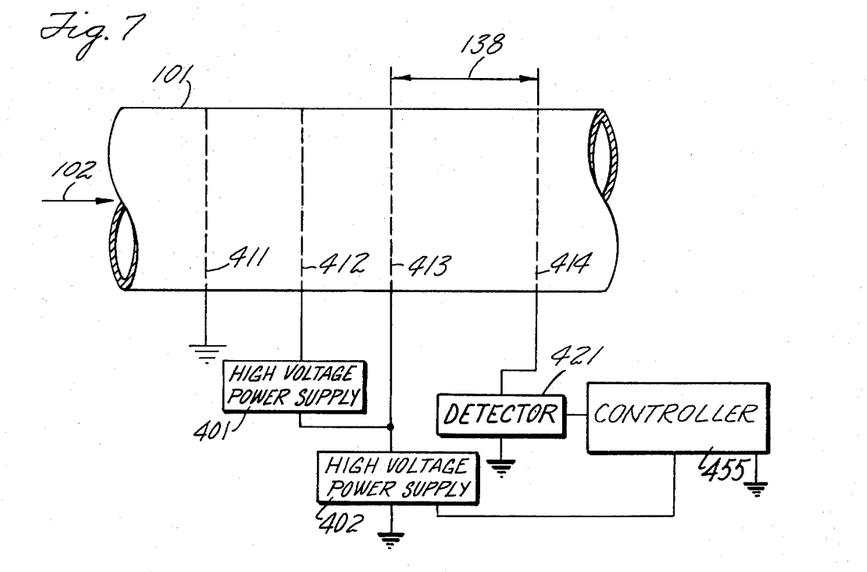
FIG. 7 shows, in partially pictorial, partially schematic form, an embodiment of the invention with an analog ionization system.

A fifth alternate embodiment of the invention combines the electrode configuration of FIG. 4 with circuits for measuring DC current flow as opposed to ion transit times. In FIG. 7, power supply 402 maintains a drift field between electrodes 413 and 414 with electrode 414 operating at near ground potential. As in the embodiment of FIG. 4, the drift field power supply alternates between two voltages V and V/2 for example. Ions are provided by corona grid 412, maintained at an appropriate voltage by power supply 401 independent of the applied drift field voltage. Grid 411 is operating as before at ground potential for safety. Circuit 421 measures the current flowing from grid 414 to ground. Controller 455 performs essentially the same functions as controller 155 of FIG. 4. It senses the current flowing through circuit 421, stores the value $I_2$ of current flowing under the influence of drift field voltage $V_2$ and combines it with the value $I_1$ derived from operating at drift field voltage $V_1$. In this embodiment, flux is determined from the following expression:

$$\text{flux} = \left(\frac{\mu_o N_o A V_1}{fL}\right) \cdot \left(\frac{fI_2 - I_1}{I_1 - I_2}\right) \quad (4)$$

where L is the drift length and $V_1 = fV_2$, (f>1) and the other symbols have been defined above.

Various embodiments of the invention including, but not limited to, alternate electrode configurations and calculating circuits will be evident to those skilled in the art. It is intended that the following claims include such embodiments and that the scope of the claims not be limited to the specific embodiments disclosed herein.

We claim:

1. An apparatus for measuring the flux of a fluid flowing along an axis through a defined region comprising:
   (a) ion means for producing a concentration of ions distributed in said fluid and for varying said ion concentration to produce upstream and downstream ion concentration changes in said fluid in the upstream and downstream directions;
   (b) a plurality of planar fluid-permeable electrodes oriented substantially perpendicular to said fluid flow and disposed along the axis of said flow region at predetermined positions;
   (c) voltage means for applying a first potential between said ion producing means and a first pair of upstream and downstream fluid-permeable electrodes, the magnitude of said first potential being such that ions in said upstream ion concentration change are attracted from said ion producing means upstream through said fluid in the presence of flow;
   (d) voltage means for applying a second potential between said first pair of upstream and downstream electrodes and a second pair of fluid-permeable electrodes located further from said ion producing means than said first pair of fluid-permeable electrodes, the magnitude of said second potential being such that ions which pass through the upstream one of said first pair of fluid permeable electrodes are attracted upstream through said fluid in the presence of flow;
   (e) first signal means for generating first and second entrance signals related in time to the passage of ion current changes through said first pair of fluid-permeable electrodes and second signal means for generating first and second exit signals related in time to the passage of upstream and downstream ion current changes through said second pair of fluid-permeable electrodes; and
   (f) combining means, responsive to said first and second signal means, for combining said first and second entrance and first and second exit signals with a representation of the magnitudes of said first and second voltages and with other physical parameters of the apparatus in a predetermined manner to form a representation of the fluid flux.

2. An apparatus according to claim 1, in which said ion means comprises an upstream ion source, a downstream ion source and a planar fluid-permeable screening electrode disposed between said upstream and downstream ion sources and having a screening potential relative to said upstream and downstream ion sources, whereby said ion sources are screened from one another.

3. An apparatus according to either of claims 1 or 2, in which the upstream electrodes of said first and second pairs of electrodes are separated by a predetermined distance and said second potential has a predetermined magnitude such that ion identity is preserved during the upstream transit time required for an upstream ion concentration change to traverse said predetermined distance.

4. An apparatus according to claim 3 in which said upstream transit time is less than one millisecond.

5. An apparatus according to claim 3, in which said first entrance and exit signals are combined to form an upstream transit time $T_1$, said second entrance and exit signals are combined to form a downstream transit time $T_2$ and said fluid flux is proportional to the quantity $(T_1-T_2)/(T_1+T_2)$.

6. An apparatus according to claim 5, in which said ion concentration is varied from a first level to a second level in a time that is substantially less than said downstream transit time.

7. An apparatus according to claim 5, in which said ion concentration is varied from a first level to a second level and back to said first level in a time that is substantially less than said downstream transit time.

8. An apparatus according to claim 3, in which said first and second entrance signals are generated a predetermined time after a variation of said ion concentration.

9. An apparatus for measuring the flux of a fluid flowing along an axis through a defined region comprising:
   (a) ion means for producing a concentration of ions distributed in said fluid and for rapidly varying said ion concentration to produce upstream and downstream ion concentration changes in said fluid in the upstream and downstream directions;
   (b) a plurality of planar fluid-permeable electrodes oriented substantially perpendicular to said fluid flow and disposed along the axis of said flow region at predetermined positions;
   (c) voltage means for applying a potential between said ion producing means and a pair of upstream and downstream fluid-permeable electrodes, the magnitude of said potential being such that ions in said upstream ion concentration change are attracted from said ion producing means upstream through said fluid in the presence of flow;
   (d) first signal means for generating an entrance signal related in time to the generation of ion concentration changes by said ion means and second signal means for generating first and second exit signals related in time to the passage of upstream and downstream ion concentration changes through said pair of fluid-permeable electrodes; and
   (e) combining means, responsive to said signal means for combining said entrance and first and second exit signals with a representation of the magnitudes of said first and second voltages and with other physical parameters of the apparatus in a predetermined manner to form a representation of the fluid flux.

10. An apparatus according to claim 9, in which said upstream fluid-permeable electrode is separated by a predetermined distance from said ion means and said magnitude of said potential is such that ion identity is preserved during the upstream transit time required for an upstream ion concentration change to traverse said predetermined distance.

11. An apparatus according to claim 10, in which said ion concentration is varied from a first level to a second level and back to said first level in a time substantially less than the downstream transit time required for an ion concentration change to travel from said ion means to said downstream fluid-permeable electrode.

12. An apparatus for measuring the flux of a fluid flowing along an axis through a defined region comprising:
   (a) ion means for producing a concentration of ions distributed in said fluid and for varying said ion concentration to produce ion concentration changes in said fluid;
   (b) a plurality of planar fluid-permeable electrodes oriented substantially perpendicular to said fluid flow and disposed along the axis of said flow region at predetermined positions;
   (c) voltage means for applying a first potential between said ion producing means and a first fluid-permeable electrode disposed on a first side of said ion producing means;
   (d) voltage means for applying a second potential between said first electrode and a second fluid-permeable electrode located on said first side further from said ion producing means than said first fluid-permeable electrode;
   (e) first signal means for generating an entrance signal related in time to the passage of ion concentration changes through said first fluid-permeable electrode and first detection means for generating an exit signal related in time to the passage of ion concentration changes through said second fluid-permeable electrode; and
   (f) combining means, responsive to said first signal means and first detection means, for combining first entrance and exit signals obtained at a first value of said second potential with second entrance and exit signals obtained at a second value of said second potential with a representation of the magnitudes of said first and second voltages and with other physical parameters of the apparatus in a predetermined manner to form a representation of the fluid flux.

13. An apparatus according to claim 12, in which said first entrance and exit signals are combined to form a representation of a first transit time $T_1$, said second entrance and exit signals are combined to form a representation of a second transit time $T_2$, where K is the ratio of said first and second potentials and in which said first and second transit times are further combined to form a quantity $(KT_1-T_2)/(T_1-T_2)$ that is multiplied by a predetermined factor to form said representation of the fluid flux.

14. An apparatus according to claim 13, in which the magnitude of said first and second transit potentials are such that ion identity is preserved during said first and second transit times.

15. An apparatus according to claim 13, in which said ion concentration is varied from a first level to a second level in a time that is substantially less than the lesser of $T_1$ and $T_2$.

16. An apparatus according to claim 13, in which said ion concentration is varied from a first level to a second level and back to said first level in a time that is substantially less than the lesser of $T_1$ and $T_2$.

17. An apparatus according to claim 12, in which said first and second entrance signals are generated a predetermined time after a variation of said ion concentration.

18. An apparatus for measuring the flux of a fluid flowing along an axis through a defined region comprising:
   (a) ion means for producing a concentration of ions distributed in said fluid and for varying said ion concentration to produce ion concentration changes in said fluid;
   (b) a plurality of planar fluid-permeable electrodes oriented substantially perpendicular to said fluid flow and disposed along the axis of said flow region at predetermined positions;

(c) voltage means for applying a first potential between said ion producing means and a first fluid permeable electrode disposed on one side of said ion producing means, the magnitude of said first potential being such that ions are attracted from said ion producing means through said fluid toward said first electrode in the presence of flow;

(d) voltage means for applying a second potential between said first electrode and a second fluid-permeable electrode located on said one side a first predetermined distance further from said ion producing means than said first fluid-permeable electrode, the magnitude of said second potential being such that ions which pass through said first fluid-permeable electrode are attracted through said fluid toward said second electrode in the presence of flow;

(e) voltage means for applying a third potential between said second fluid-permeable electrode and a third fluid-permeable electrode located on said one side a second predetermined distance further from said ion producing means than said second electrode;

(f) signal means for generating a first signal and first and second detection means for generating second and third signals related to the passage of ion current changes past said first, second and third fluid-permeable electrodes; and (g) combining means, responsive to said signal means and to said first and second detection means, for combining said first, second and third signals with a representation of the magnitudes of said first and second voltages and with other physical parameters of the apparatus in a predetermined manner to form a representation of the fluid flux.

19. An apparatus according to claim 18, in which the ratio of said second potential, $V_1$, with said first predetermined distance, $L_1$, is $E_1$, the ratio of said third potential $V_2$, with said second predetermined distance $L_2$ is $E_2$, $f=E_1/E_2$, a first transit time $T_1$ is the time between said first and second signals and a second transit time $T_2$ is the time between said second and third signals and said fluid flux is proportional to the quantity $E_2 \cdot (fL_2 T_1 - L_1 T_2)/(L_1 T_2 - L_2 T_1)$.

20. An apparatus according to claim 19, in which the magnitude of said second and third potentials is such that ion identity is preserved during said first and second transit times.

21. An apparatus according to claim 19, in which said ion concentration is varied from a first level to a second level in a time that is substantially less than the lesser of $T_1$ and $T_2$.

22. An apparatus according to claim 19, in which said ion concentration is varied from a first level to a second level and back to said first level in a time that is substantially less than the lesser of $T_1$ and $T_2$.

23. An apparatus for measuring the flux of a fluid flowing along an axis through a defined region comprising:

(a) ion means for producing a concentration of ions distributed in said fluid;

(b) a plurality of planar fluid-permeable electrodes oriented substantially perpendicular to said fluid flow and disposed along the axis of said flow region at predetermined positions;

(c) voltage means for applying a first potential between said ion producing means and a first fluid-permeable electrode disposed on one side of said ion producing means, the magnitude of said first potential being such that ions are attracted from said ion producing means through said fluid toward said first electrode in the presence of flow;

(d) voltage means for applying a second potential between said first electrode and a second fluid-permeable electrode located on said one side a first predetermined distance further from said ion producing means than said first fluid-permeable electrode, the magnitude of said second potential being such that ions which pass through said first fluid-permeable electrode are attracted through said fluid toward said second electrode in the presence of flow;

(e) means for measuring the magnitude of the flow of ions between said first and second electrodes at a first value of said second potential and for measuring the magnitude of the flow of ions between said first and second electrodes at a second value of said second potential;

(f) combining means, responsive to said measuring means, for combining representations of said first and second magnitudes of said ion flow with representations of the magnitudes of said first and second voltages and with other physical parameters of the apparatus in a predetermined manner to form a representation of the fluid flux.

24. An apparatus according to claim 23, in which the magnitudes of said first and second potentials are such that ion identity is preserved during the time required for said ions to flow along said first and second predetermined distances.

25. An apparatus according to claim 24, in which f is the ratio of said first potential to said second potential, $I_1$ and $I_2$ are the numerical magnitudes of the flow of ions between said first and second electrodes at said first and second potentials, respectively and said fluid flux is proportional to the quantity $(fI_2 - I_1)/(I_1 - I_2)$.

* * * * *